Figure 1:
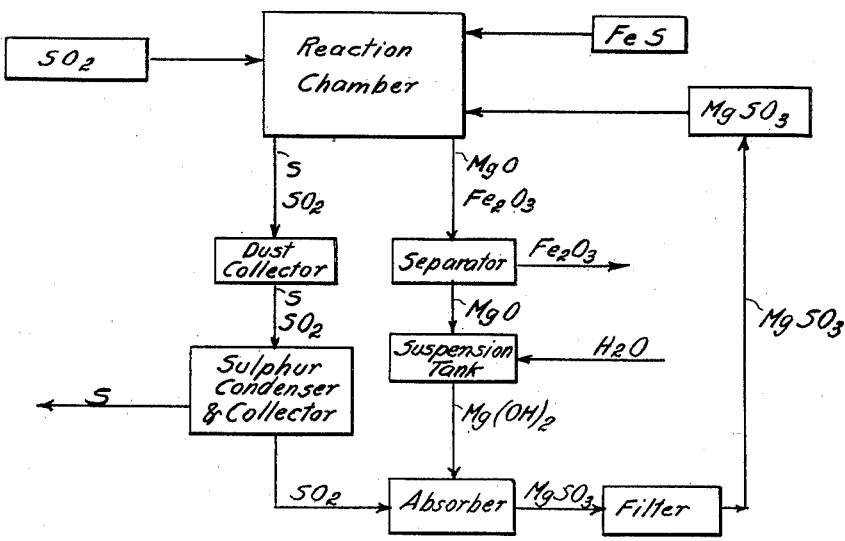

April 10, 1934.  R. F. BACON ET AL  1,954,279
RECOVERY OF SULPHUR
Filed Dec. 31, 1930

INVENTOR
RAYMOND F. BACON
AND ISAAC BENCOWITZ
BY Pennie, Davis, Marvin & Edmonds
ATTORNEYS Patented Apr. 10, 1934

1,954,279

UNITED STATES PATENT OFFICE 1,954,279

RECOVERY OF SULPHUR

Raymond F. Bacon, Bronxville, and Isaac Bencowitz, New York, N. Y., said Bencowitz assignor to said Bacon Application December 31, 1930, Serial No. 505,698

12 Claims. (Cl. 23—226)

This invention relates to the recovery of sulphur, and has for an object the provision of an improved process for recovering sulphur from heavy metal sulphide ores. More particularly, the invention relates to an improved process for recovering sulphur from materials containing one or more sulphides of iron.

When ferrous sulphide or pyrites, or a mixture of these two compounds alone or in combination with other heavy metal sulphides, is subjected to the action of sulphur dioxide at elevated temperatures, the sulphur dioxide and ferrous sulphide or pyrites react to produce ferric oxide and elemental sulphur more or less in accordance with the following equations:

$$4FeS + 3SO_2 = 2Fe_2O_3 + 7S$$
$$4FeS_2 + 3SO_2 = 2Fe_2O_3 + 11S$$

The foregoing reactions normally occur very slowly, but if they are conducted in the presence of certain metal salts containing oxygen, a material acceleration takes place. The use of such salts to accelerate the reactions forms the subject of a copending application Serial No. 472,694, filed by us.

In conducting the reaction between the iron sulphide and the sulphur dioxide, a certain amount of sulphur dioxide will generally pass off with the elemental sulphur in the exit gases and remain therein after the sulphur has been condensed and separated out. This sulphur dioxide is ordinarily not present in sufficient amount to justify its being returned to the reaction chamber because of the undue dilution which would be occasioned by the inert gases which accompany it. Nor, under ordinary circumstances would the use of relatively expensive absorbents be warranted. Its discharge into the atmosphere, however, constitutes an objectionable nuisance.

In reference to this problem, we have noted that among the suitable metal salts containing oxygen which catalyze the reactions involved, are included the sulphites of magnesium and calcium.

Magnesium sulphite, in particular, is a highly effective catalyst in this relation whether used alone or in conjunction with magnesium oxide. At the elevated temperature required to carry out the reaction between the iron sulphide and sulphur dioxide, however, the magnesium sulphite is ultimately decomposed into magnesium oxide and sulphur dioxide, the latter reacting with some of the iron sulphide to yield elemental sulphur.

In accordance with the process of the present invention, the desirable magnesium sulphite is regenerated from this residual magnesium oxide by the action of the sulphur dioxide escaping in the exit gases, thereby simultaneously accomplishing the elimination of this objectionable constituent of the gases from the operation.

An illustrative mode of carrying out this process of our invention is as follows: An intimate finely divided mixture of pyrites and magnesium sulphite is introduced into a long rotary reaction chamber having ore charging means at one end and discharging means at the opposite end, and which is so constructed and operated that the material is gradually moved from the charging end toward the discharging end, as is well known in the art. Heating means are provided within or exteriorly of the chamber to permit accurate temperature control.

The sulphur dioxide is introduced into the reaction chamber at the end opposite that at which the mixture of pyrites and magnesium sulphite is introduced, so that the reacting materials will pass through the chamber in countercurrent relationship. The sulphur dioxide may be provided by any suitable source and in any suitable concentration, but the free oxygen content of the accompanying gases should be as low as possible.

A temperature between 600–800° C. is maintained in the reaction chamber and in their controlled passage therethrough the sulphur dioxide and pyrites react to produce iron oxide and elemental sulphur. The reaction is reversible, and consequently it is advisable to pass the sulphur dioxide through the reaction chamber at such a rate that the elemental sulphur is removed sufficiently promptly after its formation.

During the period when the major reaction is taking place, the magnesium sulphite is gradually decomposed at the existing temperature into magnesium oxide and sulphur dioxide. While this decomposition results in the undesirable loss of the sulphite form of magnesium, it does not unduly arrest catalysis of the reaction inasmuch as the intermediate mixtures of magnesium oxide and magnesium sulphite, as well as magnesium oxide alone, also are capable of catalyzing it.

As a result of the various reactions, a mixture of iron oxide and magnesium oxide in finely divided form, is discharged at one end of the chamber, and elemental sulphur, a certain amount of sulphur dioxide, and the accompanying diluents pass off at the opposite end of the chamber.

An illustrative subsequent treatment of these reaction products is indicated in the flow sheet shown in Fig. 1.

The magnesium oxide is separated from the iron oxide with which it is mixed by elutriation, air-separation or in any other suitable manner.

If air-separation is resorted to, the fine powder of magnesium oxide is subsequently suspended in water, or if elutriation has been utilized, the suspension formed is used either directly or after suitable concentration if unduly diluted. This suspension is conducted to an absorber of suitable construction wherein it is brought in contact with the sulphur dioxide in the flue gases.

A satisfactory construction which will provide intimate contact and a resulting substantial extraction of the sulphur dioxide, consists of an elongated tower provided with a series of plates projecting slightly more than halfway across the inside of the tower and arranged in staggered relationship from the top to the bottom thereof. When the magnesium oxide suspension is introduced at the top of this tower it will pass downwardly in a sinuous course, the liquid being successively cascaded over the edge of each plate in the form of a thin film and thence onto the next succeeding plate. The sulphur dioxide gases are passed upwardly through the tower under either natural or forced draught in countercurrent relationship to the flow of the magnesia suspension, and are brought into very intimate contact therewith. Another satisfactory manner of obtaining suitable contact consists in simply spraying the liquid suspension into the sulphur dioxide gas flowing in countercurrent relationship thereto.

As regards the treatment of the sulphur dioxide gases prior to their being introduced at the bottom of the absorption tower, the exit gases from the reaction chamber are first passed through a dust collector of any suitable type, such for example as a mechanical baffle chamber, or an electrostatic precipitator. The dust-free gases discharged from the collector are then treated to condense and collect the elemental sulphur therein. For this purpose, a waste heat boiler followed by an electrostatic precipitator, or any other suitable apparatus may be used in which the sulphur is condensed and separated from the accompanying gases.

The residual gases from the sulphur condenser are then passed to the absorber, wherein the sulphur dioxide is extracted therefrom as noted hereinbefore.

This extraction of the sulphur dioxide can be carried out either in a single properly constructed tower or in a series of the same, the suspension of magnesium oxide being repeatedly passed through the tower if necessary to obtain a satisfactory concentration of magnesium sulphite; or where a series of towers is utilized, the suspension may be passed progressively from the last tower, where the sulphur dioxide is weakest, to the first tower, where it is most concentrated.

When the suspension of magnesium oxide has been suitably exhausted and contains a satisfactory amount of magnesium sulphite, it is subjected to filtration in a filter press, decantation or the like to separate the insoluble solid sulphite from the accompanying liquor. This solid sulphite is then mixed with iron sulphide and again utilized in the reaction chamber.

Where the moisture content of the magnesium sulphite is excessive after the filtration or decantation treatment, it may be dried to a suitable degree before being returned to the reaction chamber. A small amount of water in the sulphite is not particularly objectionable, however, for any hydrogen sulphide which might be formed therefrom in the reaction chamber would promptly react with the sulphur dioxide to yield elemental sulphur. If the mixture of magnesium sulphite and pyrites is being introduced into the reaction chamber in the form of small lumps or aggregates moreover, the presence of a certain amount of liquid is desirable in order to form the agglomerates.

Figure 2:
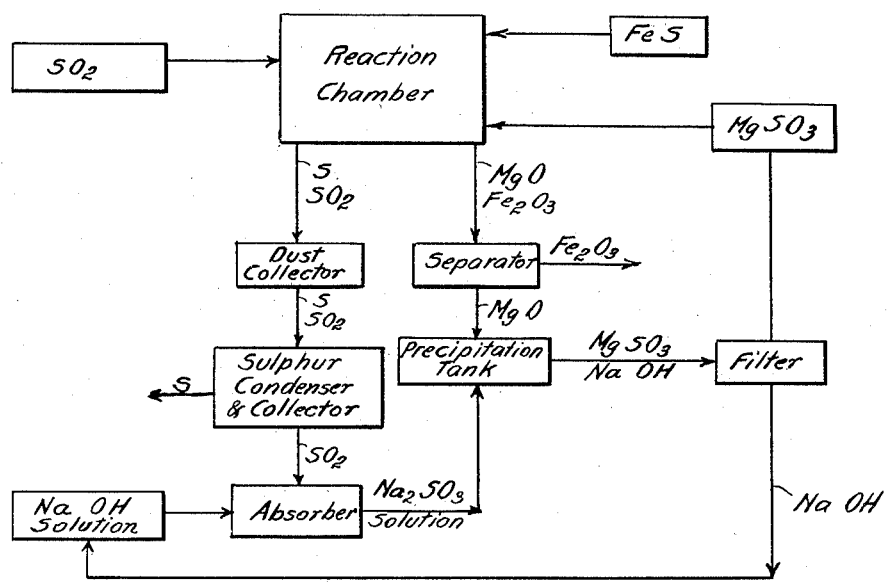

In Fig. 2 we have shown a modified process for regenerating the magnesium sulphite and recovering the sulphur dioxide from the chamber gases.

In this modification the sulphur dioxide gases from the sulphur condenser and collector are conducted into an absorbing tower down which a strong solution of sodium hydroxide is passed in lieu of the magnesia suspension indicated hereinbefore. This caustic soda will extract the sulphur dioxide in a highly effective manner and the strong solution of sodium sulphite obtained is then contacted with a suspension of the magnesium oxide from the iron separator to yield magnesium sulphite. While the absorption of an excessive amount of sulphur dioxide by the caustic soda solution may result in the formation of appreciable amounts of sodium bisulphite, this likewise will react with the magnesia to yield magnesium sulphite. The reactions which take place are substantially as follows:

I. $2NaOH + SO_2 = Na_2SO_3 + H_2O$ 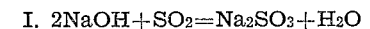
II. $Na_2SO_3 + Mg(OH)_2 = MgSO_3 + 2NaOH$ 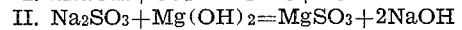
III. $NaHSO_3 + Mg(OH)_2 = MgSO_3 + NaOH + H_2O$ 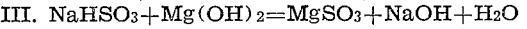

The magnesium sulphite from the precipitation tank is then separated from the accompanying caustic soda solution by means of filtration in a filter press, decantation or the like, and the regenerated caustic soda is returned for reuse in the absorber, with the addition of supplementary caustic soda if such is necessary to reconcentrate it.

The magnesium sulphite residue is then used again for the sulphur-producing reaction in the same manner as described hereinbefore.

This latter modification has the advantage that more rapid extraction of the sulphur dioxide can be accomplished, and a more concentrated sulphite solution formed without particular concern as regards the possible formation of bisulphite, in view of the fact that such can be subsequently precipitated as normal sulphite by the magnesia in a subsequent step. Moreover, the simultaneous regeneration of the caustic soda solution in the precipitation step permits its economical cyclic use.

While we have described the introduction of the sulphur dioxide into the reaction chamber from a separate source of production, the operation can be combined directly with a modified roasting operation to provide a unitary process wherein the sulphur dioxide produced by the reaction of the oxygen or air with pyrites or other sulphides of iron, reacts with additional quantities of pyrites or other sulphides of iron to produce elemental sulphur and iron oxide therefrom. Such a process forms the subject of a co-pending application Serial No. 472,695, filed by us.

Furthermore, the corresponding calcium compounds may be utilized in the specific procedure described herein in lieu of the magnesium compounds, and other changes may be made in the process as will be apparent to one skilled in the art.

We claim as our invention:

1. The process of recovering sulphur which comprises, subjecting iron sulphide to the action of sulphur dioxide in the presence of a sulphite of an alkaline earth metal whereby elemental sulphur is produced, contacting the exit gases from the reaction with the oxide of the alkaline earth metal resulting from decomposition of the sulphite during the reaction, whereby sulphur dioxide is extracted from said gases and the alkaline earth metal oxide reconverted to sulphite, and utilizing the sulphite so produced for the reaction between the iron sulphide and the sulphur dioxide.

2. The process of recovering sulphur which comprises, subjecting iron sulphide to the action of sulphur dioxide in the presence of magnesium sulphite whereby elemental sulphur is produced, contacting the exit gases from the reaction with magnesium oxide resulting from decomposition of the sulphite during the reaction, whereby sulphur dioxide is extracted from said gases and the magnesium oxide reconverted to sulphite, and utilizing the sulphite so produced for the reaction between the iron sulphide and the sulphur dioxide.

3. The process of recovering sulphur which comprises, subjecting iron sulphide to the action of sulphur dioxide in the presence of calcium sulphite whereby elemental sulphur is produced, contacting the exit gases from the reaction with calcium oxide resulting from decomposition of the sulphite during the reaction, whereby sulphur dioxide is extracted from said gases and the calcium oxide reconverted to sulphite, and utilizing the sulphite so produced for the reaction between the iron sulphide and the sulphur dioxide.

4. The process of recovering sulphur which comprises, subjecting iron sulphide to the action of sulphur dioxide in the presence of magnesium compounds including magnesium sulphite whereby elemental sulphur is produced, contacting the exit gases from the reaction with magnesium oxide resulting from decomposition of the sulphite during the reaction, whereby sulphur dioxide is extracted from said gases and the magnesium oxide reconverted to sulphite, and utilizing the sulphite so produced for the reaction between the iron sulphide and the sulphur dioxide.

5. The process of recovering sulphur which comprises, subjecting iron sulphide to the action of sulphur dioxide in the presence of a sulphite of an alkaline earth metal whereby elemental sulphur is produced, separating the elemental sulphur from the accompanying exit gases from the reaction, contacting said exit gases with the oxide of the alkaline earth metal resulting from decomposition during the iron sulphide-sulphur dioxide reaction, whereby sulphur dioxide is extracted from said gases and said oxide is reconverted to sulphite, and utilizing said regenerated sulphite for the iron sulphide-sulphur dioxide reaction.

6. The process of recovering sulphur which comprises, subjecting iron sulphide to the action of sulphur dioxide in the presence of a sulphite of an alkaline earth metal whereby elemental sulphur is produced, separating the elemental sulphur from the accompanying gases, treating the solid residue from the iron sulphide-sulphur dioxide reaction to separate the iron oxide from the alkaline earth metal oxide resulting from decomposition of the sulphite, contacting said gases with said oxide whereby sulphur dioxide is extracted from said gases and said oxide is reconverted to sulphite, and utilizing said sulphite for the iron sulphide-sulphur dioxide reaction.

7. The process of recovering sulphur which comprises, subjecting iron sulphide to the action of sulphur dioxide in the presence of a sulphite of an alkaline earth metal whereby elemental sulphur is produced, separating the elemental sulphur from the accompanying gases, treating the solid residue from the iron sulphide-sulphur dioxide reaction to separate the iron oxide from the alkaline earth metal oxide resulting from decomposition of the sulphite, preparing a suspension of said oxide in water, passing said gases through said suspension whereby the sulphur dioxide is extracted from said gases and the oxide is reconverted to sulphite, and utilizing said sulphite for the iron sulphide-sulphur dioxide reaction.

8. The process of recovering sulphur which comprises subjecting iron sulphide to the action of sulphur dioxide in a suitable reaction chamber in the presence of a sulphite of an alkaline earth metal to produce elemental sulphur, combining sulphur dioxide from the exit gases from the reaction chamber with the oxide of the alkaline earth metal resulting from decomposition of the sulphite during the reaction to regenerate the alkaline earth metal sulphite, and utilizing the regenerated alkaline earth metal sulphite in the treatment of additional iron sulphide.

9. The process of recovering sulphur which comprises subjecting iron sulphide to the action of sulphur dioxide in a suitable reaction chamber in the presence of a sulphite of a metal of the group consisting of alkaline earth metals and magnesium to produce elemental sulphur, combining sulphur dioxide contained in the exit gases from the reaction chamber with metal oxide resulting from decomposition of the sulphite during the reaction to regenerate the sulphite, and utilizing the regenerated sulphite in the treatment of additional iron sulphide.

10. The process of recovering sulphur which comprises, subjecting iron sulphide to the action of sulphur dioxide in the presence of a sulphite of an alkaline earth metal whereby elemental sulphur is produced, separating the elemental sulphur from the accompanying gases, passing said gases in contact with a solution of caustic soda whereby sulphur dioxide is extracted from said gases and sodium sulphite formed, treating the solid residue from the iron sulphide-sulphur dioxide reaction to separate the iron oxide from the oxide of the alkaline earth metal resulting from decomposition of the sulphite during the reaction, contacting said oxide with the sodium sulphite solution whereby the sulphite of the alkaline earth metal is precipitated and the caustic soda solution regenerated, re-utilizing said caustic soda solution for the extraction of additional sulphur dioxide, and utilizing said alkaline earth metal sulphite for the iron sulphide-sulphur dioxide reaction.

11. The process of recovering sulphur which comprises, subjecting iron sulphide to the action of sulphur dioxide in the presence of magnesium sulphite whereby elemental sulphur is produced, separating the elemental sulphur from the accompanying gases, passing said gases in contact with a solution of caustic soda whereby sulphur dioxide is extracted from said gases and sodium sulphite formed, treating the solid residue from the iron sulphide-sulphur dioxide reaction to separate the iron oxide from the magnesium oxide resulting from decomposition of the sulphite during the reaction, contacting said oxide with the sodium sulphite solution whereby magnesium sulphite is precipitated and the caustic soda solution regenerated, re-utilizing said caustic soda solution for the extraction of additional sulphur dioxide, and utilizing said magnesium sulphite for the iron sulphide-sulphur dioxide reaction.

12. The process of recovering sulphur which comprises, subjecting iron sulphide to the action of sulphur dioxide in the presence of calcium sulphite whereby elemental sulphur is produced, separating the elemental sulphur from the accompanying gases, passing said gases in contact with a solution of caustic soda whereby sulphur dioxide is extracted from said gases and sodium sulphite formed, treating the solid residue from the iron sulphide-sulphur dioxide reaction to separate the iron oxide from the calcium oxide resulting from decomposition of the sulphite during the reaction, contacting said oxide with the sodium sulphite solution whereby calcium sulphite is precipitated and the caustic soda solution regenerated, re-utilizing said caustic soda solution for the extraction of additional sulphur dioxide, and utilizing said calcium sulphite for the iron sulphide-sulphur dioxide reaction.

RAYMOND F. BACON.
ISAAC BENCOWITZ.